United States Patent [19]
Weder

[11] Patent Number: 6,151,869
[45] Date of Patent: *Nov. 28, 2000

[54] METHOD FOR WRAPPING A FOOD ITEM

[75] Inventor: Donald E. Weder, Highland, Ill.

[73] Assignee: Southpac Trust International, Inc.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/031,937

[22] Filed: Feb. 27, 1998

Related U.S. Application Data

[63] Continuation of application No. 08/755,525, Nov. 20, 1996, which is a continuation of application No. 08/456,990, Jun. 1, 1995, abandoned, which is a continuation of application No. 08/228,338, Apr. 15, 1994, Pat. No. 5,479,761, which is a continuation of application No. 07/922,972, Jul. 30, 1992, abandoned, which is a continuation-in-part of application No. 07/803,318, Dec. 4, 1991, Pat. No. 5,344,016, which is a continuation-in-part of application No. 07/707,417, May 28, 1991, abandoned, which is a continuation-in-part of application No. 07/391,463, Aug. 9, 1989, abandoned, which is a continuation-in-part of application No. 07/249,761, Sep. 26, 1988.

[51] Int. Cl.⁷ ............................. B65B 11/48; B65B 67/08

[52] U.S. Cl. ................................. 53/461; 53/219; 53/390

[58] Field of Search .............................. 53/461, 465, 464, 53/219, 218, 203, 390; 426/392, 396, 410

[56] References Cited

U.S. PATENT DOCUMENTS

| | | | |
|---|---|---|---|
| 682,817 | 9/1901 | Shaner ..................................... | 53/219 |
| 732,889 | 7/1903 | Paver . | |
| 1,525,015 | 2/1925 | Weeks ...................................... | 53/461 |
| 1,661,479 | 3/1928 | Josephson ................................ | 53/461 |
| 1,863,216 | 6/1932 | Wordingham . | |
| 1,925,176 | 9/1933 | Dean ........................................ | 53/219 |
| 1,946,569 | 2/1934 | Clark ........................................ | 53/461 |
| 1,978,631 | 10/1934 | Herrlinger . | |
| 2,048,123 | 7/1936 | Howard .................................... | 229/87 |
| 2,152,323 | 3/1939 | Moore ....................................... | 53/482 |
| 2,170,147 | 8/1939 | Lane .......................................... | 206/56 |
| 2,248,687 | 7/1941 | Nakahiro .................................. | 53/219 |
| 2,278,673 | 4/1942 | Savada et al. ............................ | 154/43 |
| 2,371,985 | 3/1945 | Freiberg ................................... | 206/46 |
| 2,449,334 | 9/1948 | Smith ....................................... | 53/461 |
| 2,529,060 | 11/1950 | Trillich .................................... | 117/68.5 |
| 2,536,773 | 1/1951 | Saidel ....................................... | 53/480 |
| 2,822,287 | 2/1958 | Avery et al. .............................. | 117/14 |
| 2,840,962 | 7/1958 | Stremke et al. ......................... | 53/219 |
| 2,846,060 | 8/1958 | Yount ....................................... | 206/58 |
| 2,906,069 | 9/1959 | Page et al. ............................... | 53/461 |
| 2,987,402 | 6/1961 | Dold et al. ............................... | 426/413 |
| 3,031,818 | 5/1962 | Meyer et al. ............................. | 53/219 |
| 3,121,647 | 2/1964 | Harris et al. ............................. | 118/202 |
| 3,130,113 | 4/1964 | Silman ...................................... | 161/97 |
| 3,271,922 | 9/1966 | Wallerstein et al. ..................... | 53/3 |
| 3,299,612 | 1/1967 | Bernhardt ................................. | 53/219 |
| 3,314,211 | 4/1967 | Wolff ........................................ | 53/461 |
| 3,503,759 | 3/1970 | Wilton ...................................... | 53/469 |
| 3,508,372 | 4/1970 | Wallerstein et al. ..................... | 53/3 |

(List continued on next page.)

FOREIGN PATENT DOCUMENTS

| | | |
|---|---|---|
| 1557833 | 1/1969 | France . |
| 2150897 | 4/1973 | France . |

OTHER PUBLICATIONS

Speed Cover Brochure, "The Simple Solution For Those Peak Volume Periods" Highland Supply Corp. ©1989.

Speed Sheets & Speed Rolls Brochure, Highland Supply Corporation, ©1990.

*Primary Examiner*—James F. Coan
*Attorney, Agent, or Firm*—Dunlap, Codding & Rogers, P.C.

[57] ABSTRACT

A wrapping material for wrapping hamburgers or other food items is provided, the wrapping material having a bonding material disposed on either an upper surface or a lower surface.

8 Claims, 13 Drawing Sheets

U.S. PATENT DOCUMENTS

| | | | |
|---|---|---|---|
| 3,514,012 | 5/1970 | Martin | 220/63 |
| 3,620,366 | 11/1971 | Parkinson | 206/89 C |
| 3,717,244 | 2/1973 | Smith | 53/482 |
| 3,793,799 | 2/1974 | Howe et al. | 53/461 |
| 3,830,035 | 8/1974 | Hoover | 53/460 |
| 3,988,873 | 11/1976 | Oliverius | 53/469 |
| 3,991,881 | 11/1976 | Augurt | 53/481 |
| 4,054,697 | 10/1977 | Reed et al. | 428/40 |
| 4,251,552 | 2/1981 | Uno et al. | 426/410 |
| 4,379,101 | 4/1983 | Smith | 264/40.3 |
| 4,380,564 | 4/1983 | Cancio et al. | 428/167 |
| 4,413,725 | 11/1983 | Bruno et al. | 206/45.33 |
| 4,458,466 | 7/1984 | Carbone et al. | 53/219 |
| 4,546,875 | 10/1985 | Zweber | 206/0.82 |
| 4,686,814 | 8/1987 | Yanase | 53/469 |
| 4,733,521 | 3/1988 | Weder et al. | 53/580 |
| 4,750,668 | 6/1988 | Behne et al. | |
| 4,765,464 | 8/1988 | Ristvedt | 206/0.82 |
| 4,773,182 | 9/1988 | Weder et al. | 47/72 |
| 4,897,983 | 2/1990 | Hogenkamp et al. | 53/481 |
| 5,007,229 | 4/1991 | Weder et al. | 53/461 |
| 5,111,638 | 5/1992 | Weder | 53/397 |
| 5,167,974 | 12/1992 | Grindrod et al. | 426/415 |
| 5,182,895 | 2/1993 | Lugo | 53/469 |
| 5,479,761 | 1/1996 | Weder | 53/461 |

FIG. 27

METHOD FOR WRAPPING A FOOD ITEM

This application is a continuation of application U.S. Ser. No. 08/755,525, filed Nov. 20, 1996, entitled "HAMBURGER AND FOOD WRAPPER", now abandoned; which is a continuation of U.S. Ser. No. 08/456,990, filed Jun. 1, 1995, entitled "HAMBURGER AND FOOD WRAPPER", now abandoned; which is a continuation of U.S. Ser. No. 08/228,338, filed Apr. 15, 1994, entitled "METHOD OF WRAPPING A FOOD ITEM", now U.S. Pat. No. 5,479,761; which is a continuation of U.S. Ser. No. 07/922,972, filed Jul. 30, 1992, entitled "HAMBURGER AND FOOD WRAPPER", now abandoned; which is a continuation-in-part of U.S. Ser. No. 07/803,318, filed Dec. 4, 1991, entitled "WRAPPING MATERIAL FOR WRAPPING A FLORAL GROUPING HAVING STAGGERED STRIPS OF ADHESIVE APPLIED THERETO AND METHOD", now U.S. Pat. No. 5,344,016; which is a continuation-in-part of U.S. Ser. No. 07/707,417, filed May 28, 1991, entitled "WRAPPING A FLORAL GROUPING WITH SHEETS HAVING ADHESIVE OR COHESIVE MATERIAL APPLIED THERETO", now abandoned; which is a continuation-in-part of U.S. Ser. No. 07/391,463, filed Aug. 9, 1989, entitled "ADHESIVE APPLICATOR DISPENSER", now abandoned; which is a continuation-in-part of U.S. Ser. No. 07/249,761, filed Sep. 26, 1988, entitled "METHOD FOR WRAPPING AN OBJECT IN A MATERIAL HAVING PRESSURE SENSITIVE ADHESIVE THEREON, now abandoned. The content of the parent application is hereby incorporated herein by reference.

FIELD OF THE INVENTION

The present invention relates generally to wrapping material for wrapping hamburgers or other foods and, more particularly, but not by way of limitation, to a wrapping material having a bonding material on one surface.

BRIEF DESCRIPTION OF THE DRAWINGS

FIG. 26 is a perspective view of still another modified wrapper.

DESCRIPTION OF THE PREFERRED EMBODIMENTS

Figure 1:
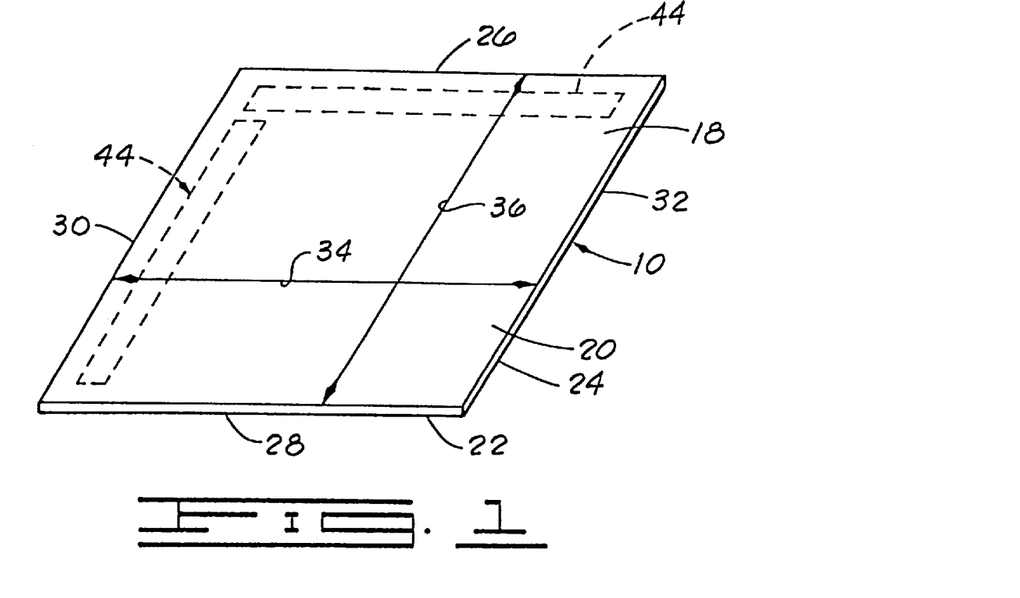
FIG. 1 is a perspective view of one embodiment of the present invention, showing a sheet of material with bonding material disposed on the lower surface in two strips.
Figure 4:
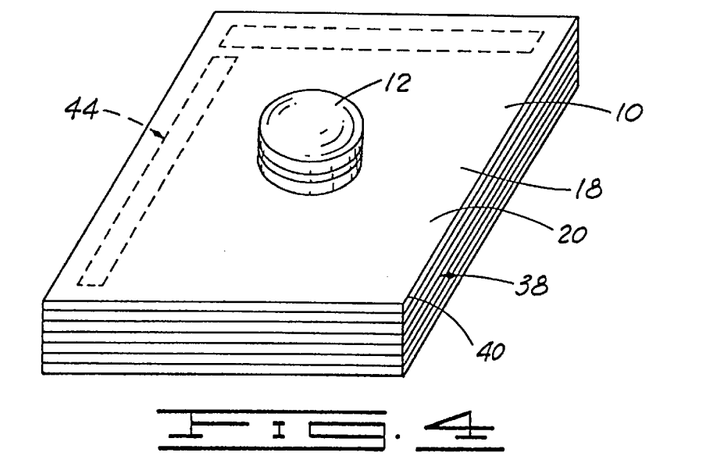
FIG. 4 is a perspective view of a plurality of sheets of material with each sheet being constructed as shown in FIG. 1 and with the sheets connected together to form a pad of sheets of material, as shown in FIG. 2, a hamburger being shown disposed on a portion of the top sheet of material in the pad.
Figure 5:
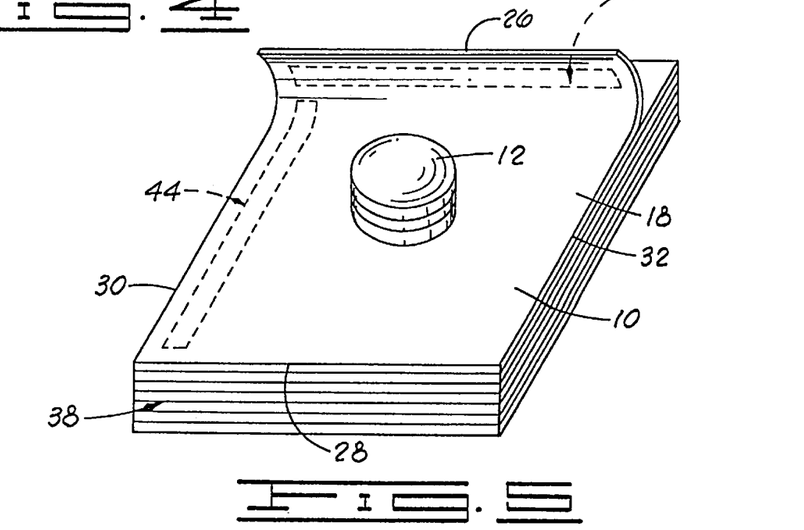
FIG. 5 is a perspective view of the pad of sheets of material shown in FIG. 4, but showing a portion of the top sheet of material in the process of being folded over the hamburger.

Referring to FIG. 1, designated generally by the reference number 10 is a wrapping material, constructed in accordance with the present invention for wrapping an item, the item being a food item. One such food item is shown in FIG. 4, and is generally designated by the number 12.

"Food item", or "item", as used herein, means animal or vegetable material suitable for consumption for nutritive or physiological benefit or use by animals or humans. Such food may be uncooked, boiled, baked, broiled, cooked, fried, or in some other condition or state of completion. A particular food item shown in the drawings, solely for illustration and not by way of limitation, is a hamburger. In one embodiment, the food item is a prepared food which has been prepared and is suitable for consumption and which is intended to be consumed on the premises where it has been prepared or taken from such premises and consumed at a location remote from such premises.

Figure 2:
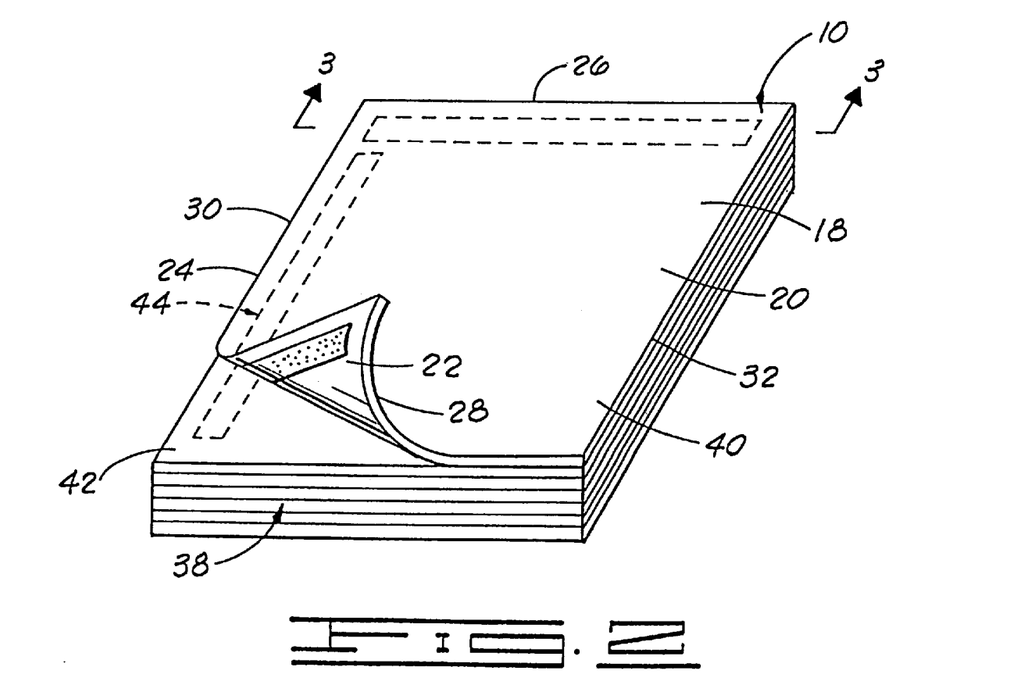
FIG. 2 is a perspective view of a plurality of sheets of material with each sheet being constructed as shown in FIG. 1 and with the sheets connected together to form a pad. A corner of the top sheet is turned up to show the lower surface.
Figure 3:
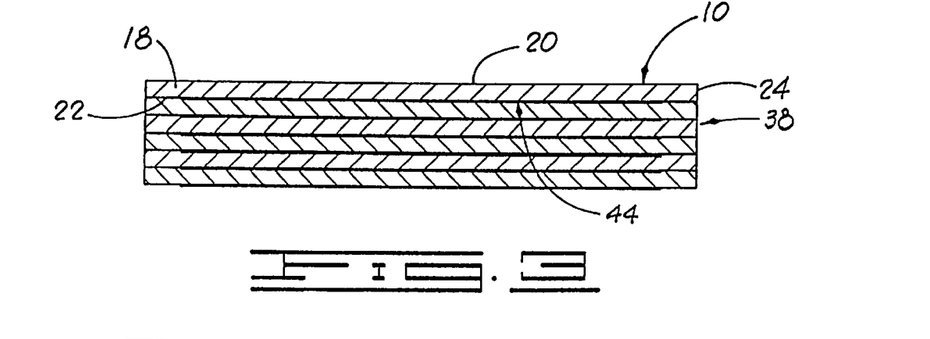
FIG. 3 is an enlarged cross sectional partial view of FIG. 2 taken along the lines of 3—3 of FIG. 2, showing a vertical alignment of bonding material adhesive strips.

Referring to FIGS. 1–2, the wrapping material 10 comprises a sheet of material 18. The sheet of material 18 comprises an upper surface 20, a lower surface 22, and an outer periphery 24. The outer periphery 24 of the sheet of material 18 comprises a first side 26, a second side 28, a third side 30, and a fourth side 32.

In the embodiments of FIGS. 1–24, the sheet of material 18 is square. It will be appreciated, however, that any shape or size of sheet 18 may be used to wrap a food item 12 as long as it is sufficiently sized and shaped to wrap and encompass a food item 12. For example, the sheet of material 18 may also comprise other shapes, i.e., rectangular, round, oval, octagonal, asymmetrical or any other geometric configuration. Additionally the sheet of material 18 may be cut to represent a particular shape or figure, such as a figure of a fish or a bull. Multiple sheets of material 18 may also be used. Moreover, when multiple sheets of material 18 are used in combination, the sheets of material 18 need not be uniform in size or shape. Finally, it will be appreciated that each sheet of material 18 shown herein is substantially flat.

The sheet of material 18 may be constructed of a single sheet of material or a plurality of sheets. Any thickness of the sheet of material 18 may be utilized in accordance with the present invention as long as the sheet of material 18 is sufficiently flexible to be wrapped about at least a portion of a food item 12, as described below. The sheet of material 18 preferably has a thickness in a range of less than about 0.2 mils to about 30 mils. Typically the sheet of material 18 has a thickness in a range of from about 0.2 mils to about 10 mils.

In one preferred embodiment, the sheet of material 18 is constructed from one sheet of man-made organic polymer film having a thickness in a range of from about 0.5 mils to about 5.0 mils. Additionally, an insulating material can be utilized in order to provide needed protection for the food item 12 wrapped if desired in a particular application and if the sheet of material 18 is not constructed of a material with sufficient heat insulating qualities. The additional insulating material may be in the form of a separate sheet of material or a material incorporated in the sheet of material 18 or otherwise applied to one or both of the upper and the lower surfaces 20 and 22 of the sheet of material. Such insulating materials are known in the art, and commercially available.

The sheet of material 18 is constructed from any suitable material that is capable of being wrapped about a food item 12. Preferably the wrapping material 10 comprises paper (untreated or treated in any manner), cellophane, foil, man-made organic polymer film, fiber (woven or unwoven or synthetic or natural), or combinations thereof.

The sheet of material 18 may vary in color. Further, the sheet of material 18 may consist of designs which are printed, etched, and/or embossed; in addition the sheet of material 18 may have various colorings, coatings, flocking and/or metallic finishes, or be characterized totally or partially by pearlescent, translucent, transparent, iridescent, or the like, qualities. Each of the above-named characteristics may occur alone or in combination. Moreover, each surface of the sheet of material 18 may vary in the combination of such characteristics.

Each sheet of material 18 has a width 34 (FIG. 1) extending generally between the third and fourth sides 30 and 32 respectively, sufficiently sized whereby each sheet of material 18 can be wrapped about and encompass the food item 12. Each sheet of material 18 has a length 36 (FIG. 1), extending generally between the first and second sides 26 and 28 respectively, sufficiently sized whereby the sheet of material 18 extends over the food item 12 when the sheet of material 18 has been wrapped about the food item 12 in accordance with the present invention.

The present invention contemplates a plurality of sheets of material 18 connected together to form a pad 38 of sheets of material 18 as shown in FIGS. 2–12. The pad 38 comprises a plurality of sheets of material 18 stacked one on top of the other and positioned so that the outer periphery 24. That is, the first sides 26, the second sides 28, the third sides 30 and the fourth sides 32 of sheets of material 18 in the pad 38 generally are aligned.

Referring to FIG. 2, the pad 38 further comprises a top sheet of material 40 and a next sheet of material 42 disposed thereunder, the other sheets of material 18 being disposed under the next sheet of material 42 in the pad 38 of sheets of material 18. The top sheet of material 40 is capable of being disconnected from the pad 38 of sheets of material 18. When the top sheet of material 40 is disconnected, the next sheet of material 42 forms the new top sheet of material 40, and the sheet of material 18 lying under the new top sheet of material 40 forms a new next sheet of material 42.

A bonding material 44 is affixed on the lower surface 22 of the sheet of material 18, as illustrated in FIGS. 1–10 and 18–20. In another embodiment, a bonding material 43 is affixed to the upper surface 20b of a sheet of material 18b, as illustrated in FIGS. 13–19.

The term "bonding material" as used herein means a pressure sensitive adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material as described herein.

The bonding material 44 is disposed across the lower surface 22 of the sheet of material 18, so as to permit the sheet of material 18 to be folded into a package 16 about a food item 12, as shown in FIGS. 4–12. Alternately, the bonding material 43 may be disposed across the upper surface 20b of the sheet of material 18b, so as to permit the sheet of material 18b to be folded into a package 16b about the food item 12, as shown in FIGS. 14–19, or to be folded into a package 16 into which a food item 12 may be inserted (not shown).

Figure 20:
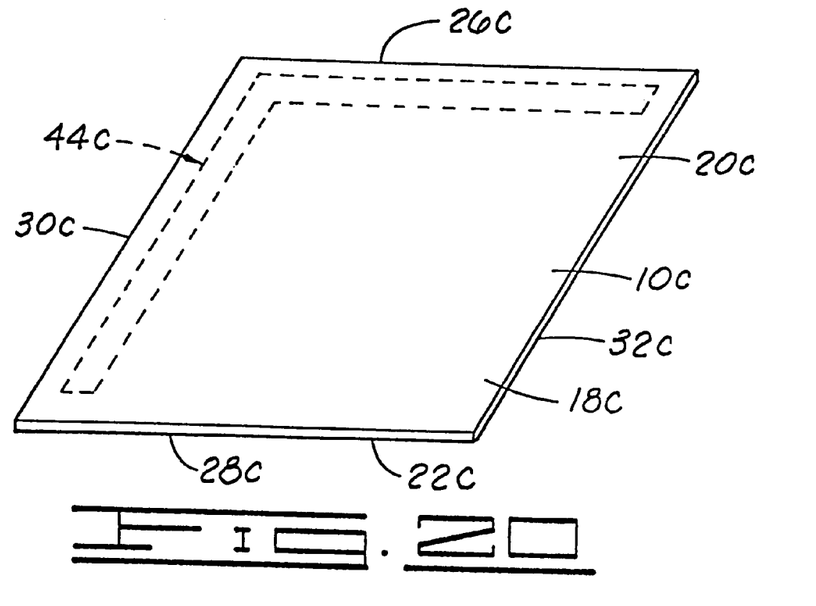
FIG. 20 is a perspective view of a modified sheet of material similar to the sheet of material shown in FIG. 1, except that the bonding material is shown in a continuous strip.
Figure 21:
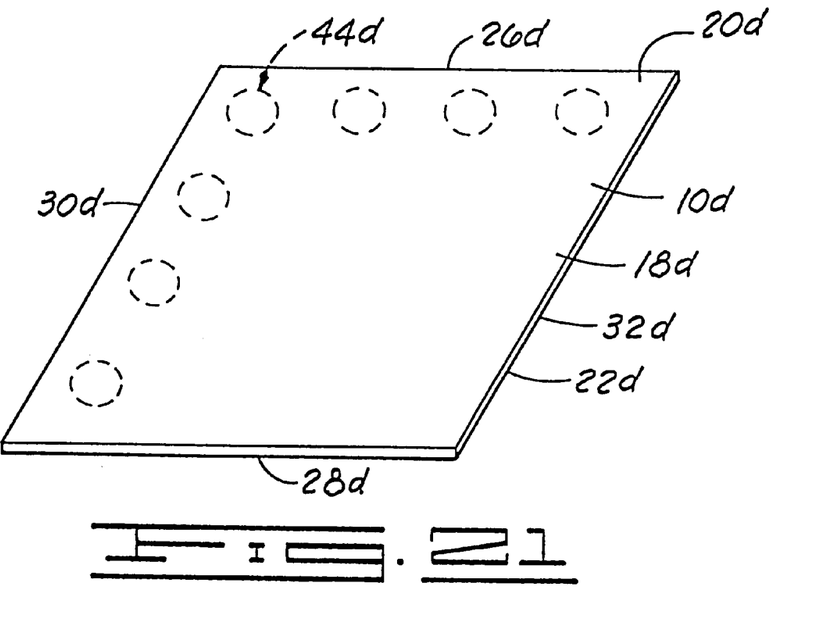
FIG. 21 is a perspective view of another modified sheet of material similar to the sheet of material shown in FIG. 1, except that the bonding material is shown in a series of circle-shaped spots.
Figure 22:
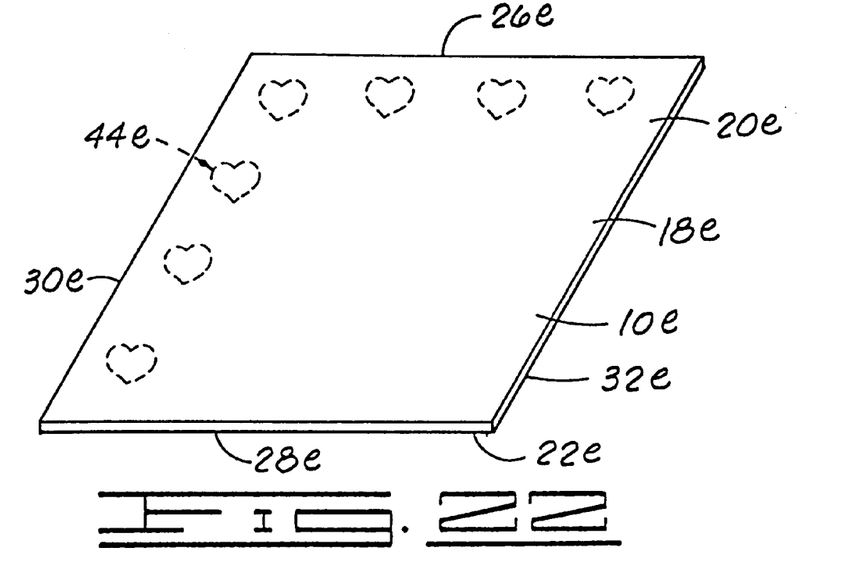
FIG. 22 is a perspective view of still another modified sheet of material similar to the sheet of material shown in FIG. 1, except that the bonding material is shown in a series of heart-shaped spots.

The bonding material 44 may be disposed across the lower surface 22 of the sheet of material 18 in strips of bonding material 44 (FIG. 1), a continuous strip of bonding material 44c (FIG. 20), or spots of bonding material 44d or 44e (FIGS. 21 and 22). Alternately, the bonding material may be disposed across the upper surface 20b of the sheet of material 18b in strips of bonding material 43 (FIG. 13), a continuous strip of bonding material 44f (FIG. 23), or spots of bonding material 44g (FIG. 24).

Figure 24:
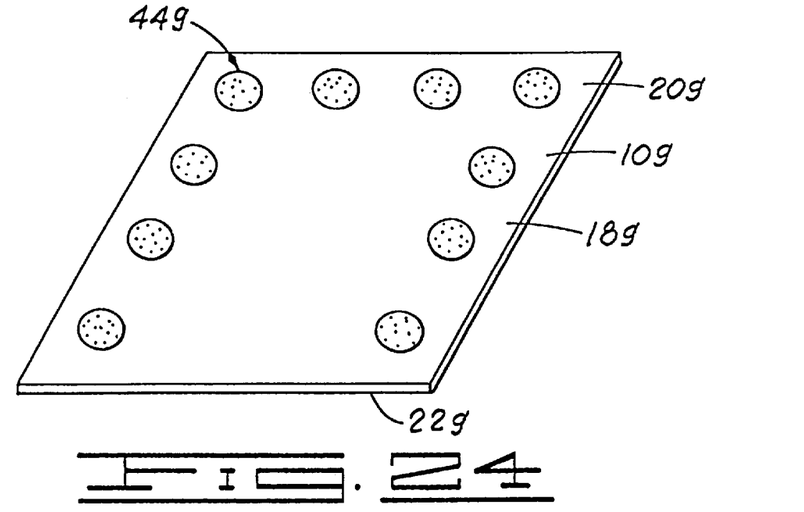
FIG. 24 is a perspective view of another modified sheet of material similar to the sheet of material shown in FIG. 13, except that the bonding material is shown in a series of circle-shaped spots.

Spots of bonding material 44d or 44e or 44g may comprise any geometric form, such as squares, parallelograms, triangles, rectangles, octagonals, or the like, with circle shapes being shown only by way of example (FIGS. 21 and 24). Spots of bonding material 44d or 44e or 44g may also comprise nongeometric or fanciful forms, such as hearts (FIG. 22), flowers, lace, slogans, logos, or the like.

The bonding material may be affixed to the surface of the sheet of material by spraying it thereupon, painting it thereupon, rolling it thereupon, or by any other method known to the art which would dispose the bonding material thereupon.

Ink, dye, pigment, or any combination thereof of any color, or combination of colors can be mixed with the bonding material, to create a colored bonding material adhesive (or cohesive). Spots of colored adhesive or cohesive may provide all, or part of, the surface decoration of the sheet of material.

The bonding material used in strips and spots of bonding material defined herein may be any one or more of those where the pressure sensitive adhesive or cohesive permits an adhesive connection and releasable connection between sheets of material 18. Such adhesives and cohesives are known in the art and commercially available.

The deposition of bonding material on each sheet of material 18 bondingly and releasably connects each sheet of material 18 to one other sheet of material 18 to form the pad 38 whereby one of the sheets of material 18 can be releasably disconnected from another sheet of material 18 by pulling the sheets of material 18 apart. The bonding material further imparts sufficient adhesion or bonding to permit the sheet of material 18 to wrap and encompass the food item 12, by bondingly or adhesively connecting one portion of the sheet of material 18 to itself.

The bonding material affixed to the lower surface 22 of the sheet of material 18 is in the form of strips of bonding material 44, as shown in FIGS. 1–4, with one strip of bonding material 44 near the first side 26 of the sheet of material 18 and extending a distance between the third side 30 and the fourth side 32 of the sheet of material 18, and with an additional strip of bonding material 44 near the third side 30 of the sheet of material 18, extending a distance between the first side 26 and the second side 28 of the sheet of material 18. It should be noted that the strips of bonding material 44 may be disposed adjacent to the first side 26 and the third side 30 of the sheet of material 18, rather than spaced a distance from the first side 26 and the third side 30, as shown in FIGS. 1–4. It is understood that, as the sheet of material 18 is changed in orientation, the strips of adhesive 44 may extend between any two opposite sides of the sheet of material 18.

The modified sheet of material 18c, shown in FIG. 20, is constructed exactly like the sheet of material 18 described in detail before, except that the bonding material is disposed in a continuous strip of bonding material 44c, with a portion of the continuous strip of bonding material 44c near the first side 26 of the sheet of material 18, and with a further portion of the continuous strip of bonding material 44c near the third side 30 of the sheet of material 18.

Shown in FIGS. 21 and 22 are sheets of material 18d and 18e, respectively, constructed exactly like the sheet of material 18 described in detail before, except that the bonding material is applied in the form of circle-shaped spots of bonding material 44d to sheet of material 18d and in the form of heart-shaped spots of bonding material 44e to sheet of material 18e.

Figure 13:
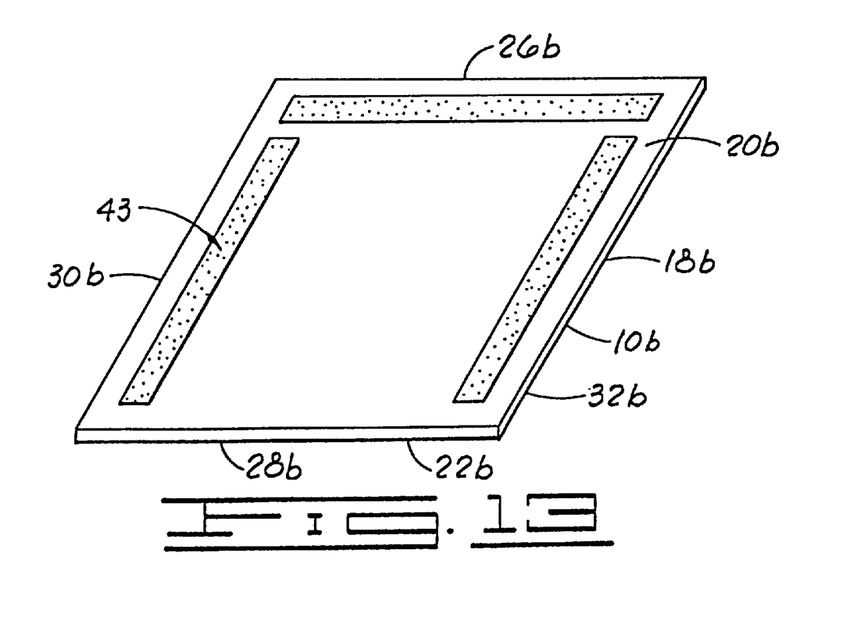
FIG. 13 is a perspective view of another embodiment of the present invention, showing a sheet of material with bonding material disposed on the upper surface in three strips.

The modified sheet of material 18b (FIG. 13–19) has bonding material affixed to the upper surface 20b of the sheet of material 18b in the form of strips of bonding material 43, as shown in FIG. 13. One strip of bonding material 43 is near the fourth side 32b of the sheet of material 18b and extending a distance between the first side 26b and the second side 28b of the sheet of material 18b. There is an additional strip of bonding material 43 near the first side 26b of the sheet of material 18b, extending a distance between the third side 30b and the fourth side 32b of the sheet of material 18b, and yet another strip of bonding material 43 near the third side 30b of the sheet of material 18b and extending a distance between the first side 26b and the second side 28b of the sheet of material 18b. It should be noted that the strips of bonding material 43 may be disposed adjacent to the fourth side 32b, the first side 26b,and the third side 30b of the sheet of material 18b, rather than spaced a distance from the fourth side 32b, the first side 26b and the third side 30b, as shown in FIGS. 13–19. It is understood that, as the sheet of material 18b is changed in orientation, the strips of bonding material 43 may extend between any two opposite sides of the sheet of material 18b.

Figure 23:
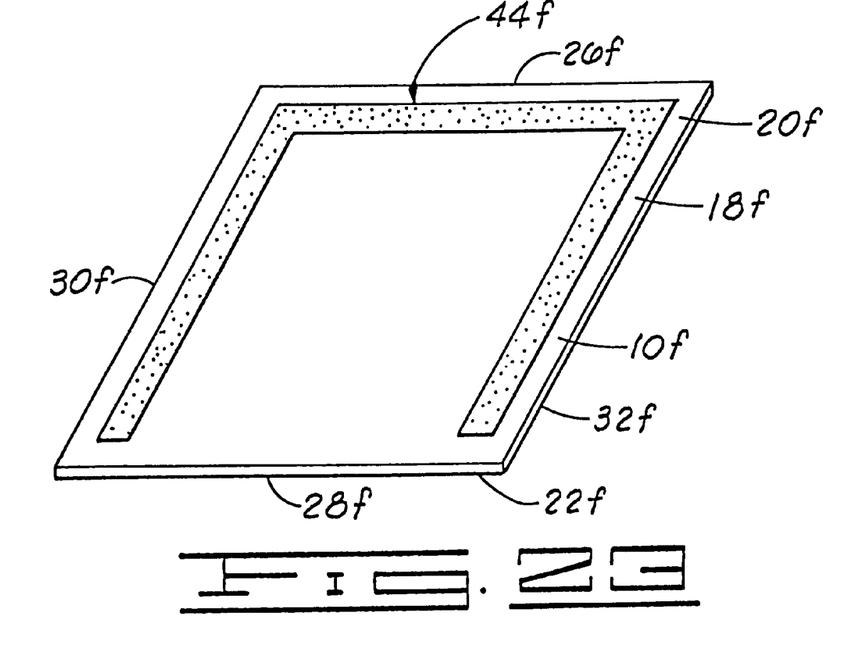
FIG. 23 is a perspective view of a modified sheet of material similar to the sheet of material shown in FIG. 13, except that the bonding material is shown in a continuous strip.

Shown in FIG. 23 is a sheet of material 18f, constructed exactly like the sheet of material 18b described before, except that the bonding material is disposed in a continuous strip of bonding material 44f, with a portion of the continuous strip of bonding material 44f near the fourth side 32f of the sheet of material 43 and extending a distance between the first side 26f and the second side 28f, with an additional portion of the continuous strip of bonding material 44f near the first side 26f of the sheet of material 18f and extending a distance between the fourth side 32f and the third side 30f, and with yet another portion of the continuous strip of bonding material 44f near the third side 30f of the sheet of material 18f and extending a distance between the first side 26f and the second side 28f.

The modified sheet of material 18g shown in FIG. 24 is constructed exactly like the sheet of material 18b described before, except the bonding material is disposed on the upper surface 20g of the sheet of material 18g in the form of circle-shaped spots of bonding material 44g.

Figure 6:
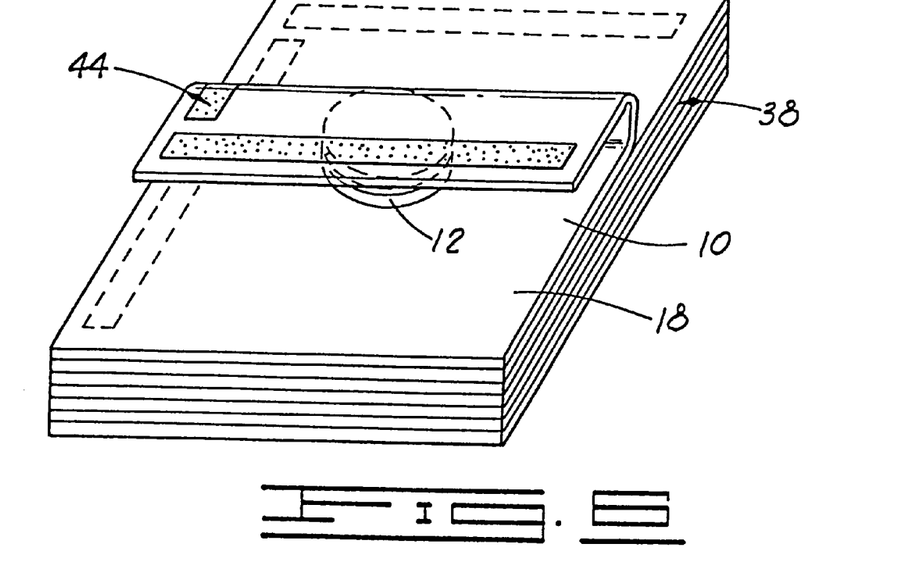
FIG. 6 is a perspective view of the pad of sheets of material shown in FIG. 5 with a portion of the top sheet of material folded over the hamburger.
Figure 7:
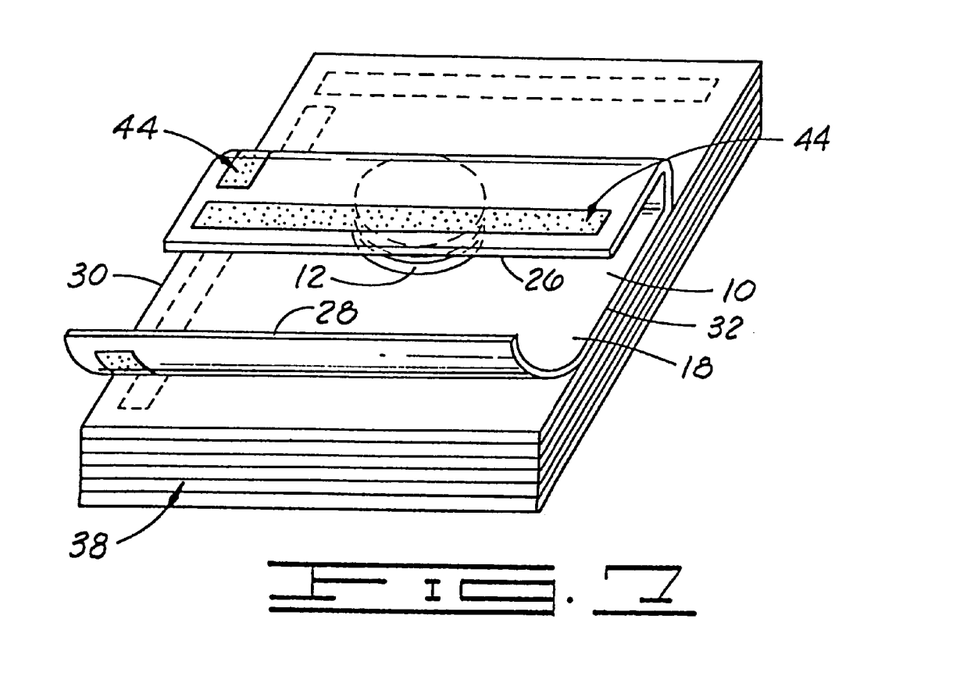
FIG. 7 is a perspective view of the pad of sheets of material shown in FIG. 6, showing a second portion of the top sheet of material in the process of being folded over the first portion of the top sheet of material and the hamburger.
Figure 8:
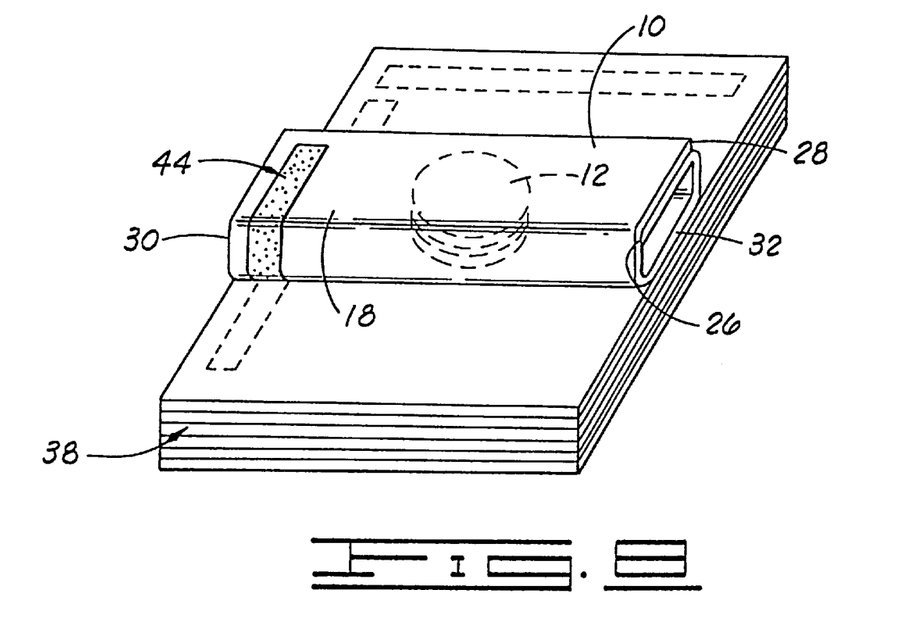
FIG. 8 is a perspective view of the pad of sheets of material shown in FIG. 7, with the second portion of the top sheet of material folded over the first portion of the top sheet of material and the hamburger.

FIGS. 4–12 show a specific method of use. A food item 12 is disposed on the upper surface 20 of the top sheet of material 40 in a pad 38 of sheets of material 18 in a non-contact relationship with respect to the bonding material 44 (FIG. 4). The first side 26 of the top sheet of material 40 is folded over the food item 12 (FIG. 5), causing the strip of bonding material 44 on the lower surface 22 of the top sheet of material 40 to be exposed (FIG. 6). The second side 28 of the top sheet of material 40 is folded over the first side 26 and the food item 12 (FIG. 7), the upper surface 20 of the second side 28 bondingly connecting to the strip of bonding material 44 on the lower surface 22 of the first side 26, and exposing a portion of the strip of bonding material 44 on the lower surface 22 of the top sheet of material 40 near the third side 30 (FIG. 8).

Figure 9:
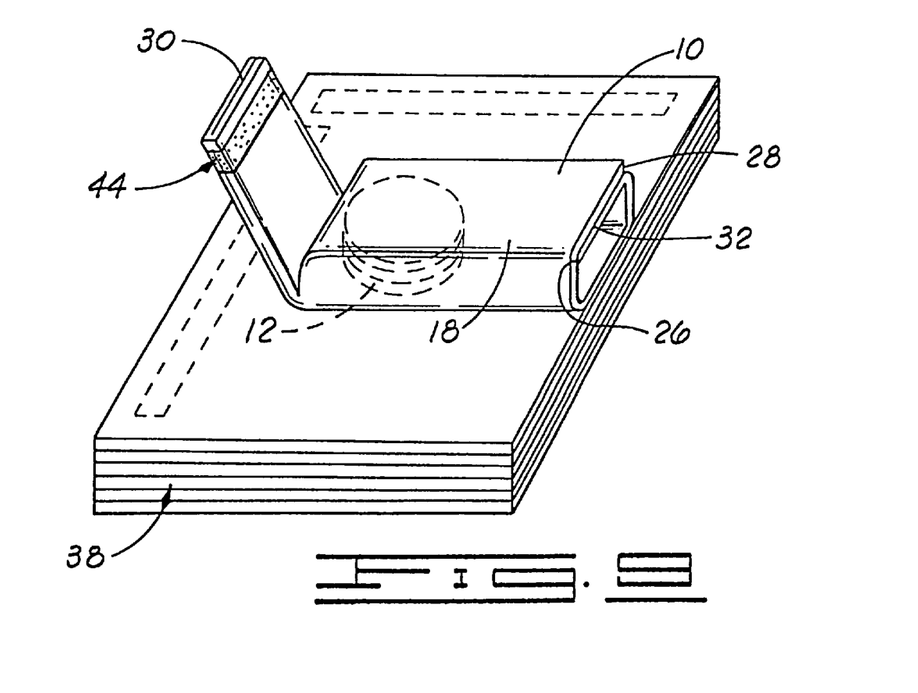
FIG. 9 is a perspective view of the pad of sheets of material shown in FIG. 8, with a third portion of the top sheet of material in the process of being folded over the first portion of the sheet, the second portion of the sheet, and the hamburger.
Figure 10:
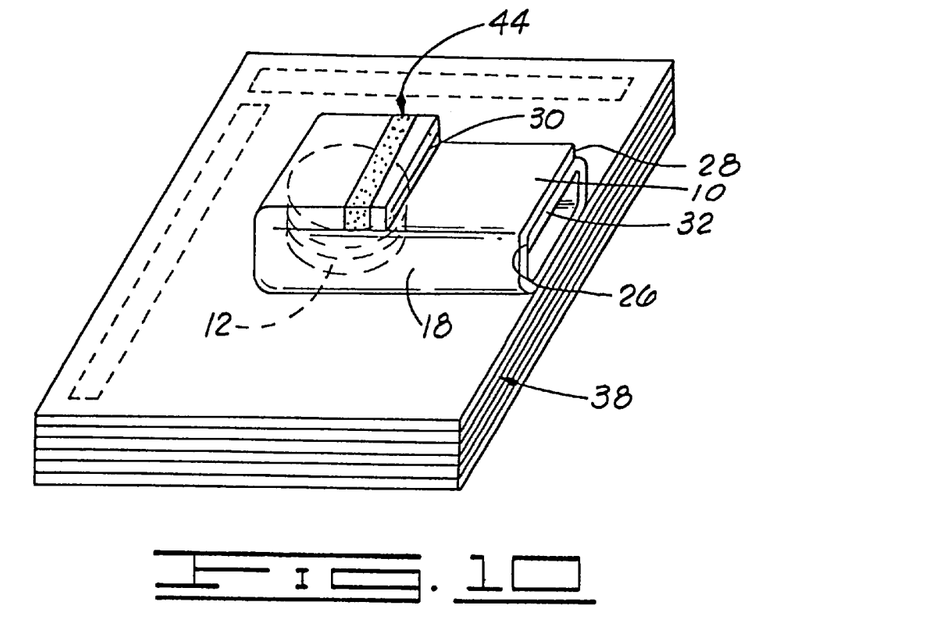
FIG. 10 is a perspective view of the pad of sheets of material shown in FIG. 9, with the third portion of the top sheet of material folded over the first portion of the sheet of material, the second portion of the sheet of material, and the hamburger.
Figure 11:
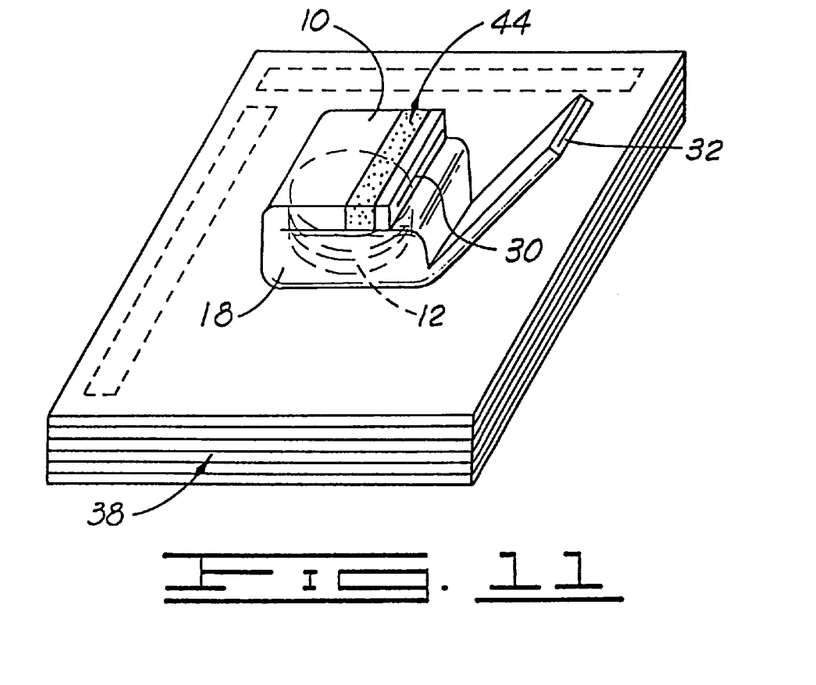
FIG. 11 is a perspective view of the pad of sheets of material shown in FIG. 10, with a fourth portion of the top sheet of material in the process of being folded over the first portion of the sheet, the second portion of the sheet, the third portion of the sheet, and the hamburger.

The third side 30 is then folded over the overlapping portion of the first side 26 and the second side 28, which, in turn, encompass the food item 12 (FIG. 9). The exposed portion of the bonding material strip 44 bondingly connects with a portion of the top sheet of material 40, and a further portion of the bonding material strip 44 near the third side 30 is exposed (FIG. 10).

Figure 12:
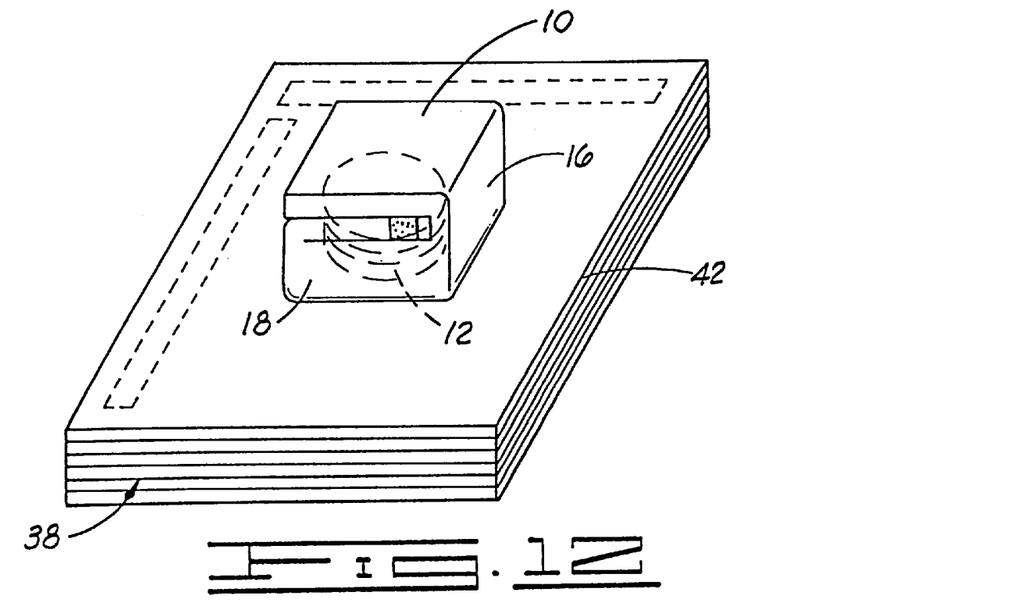
FIG. 12 is a perspective view of the pad of sheets of material shown in FIG. 11, with the top sheet of material completely folded about the hamburger.

The fourth side 32 is then folded over the overlapping portions of the first side 26, the second side 28, and the third side 30 (FIG. 11), connecting bondingly to a portion of the bonding material strip 44 near the third side 30. The above-described folding results in the top sheet of material 40 being formed into a package 16 which completely encompasses the food item 12, and exposing the next sheet of material 42 for use (FIG. 12).

Figures 14, 15:
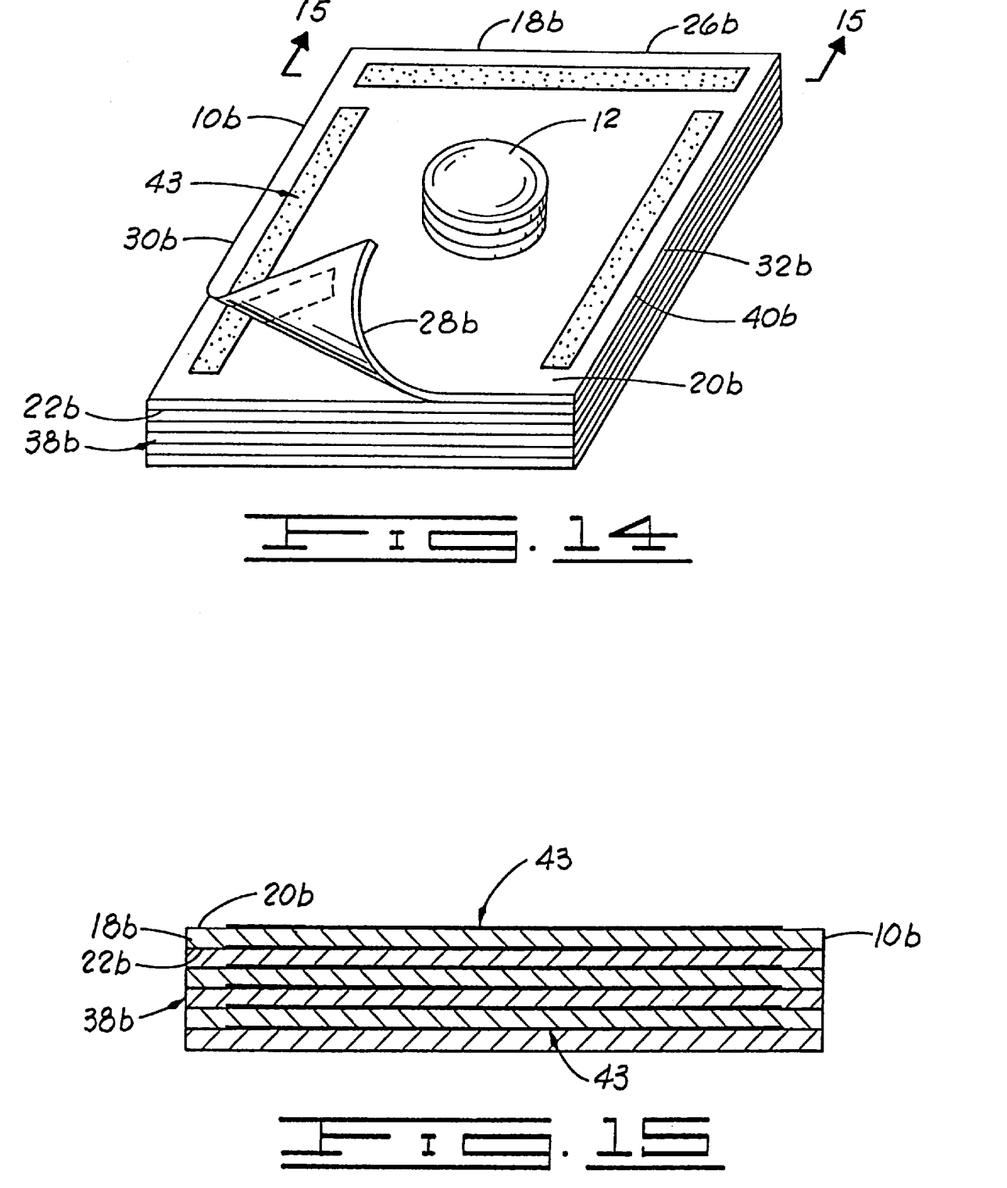
FIG. 14 is a perspective view of a plurality of sheets of material with each sheet being constructed as shown in FIG. 13 and with the sheets connected together to form a pad. A hamburger is shown disposed on a portion of the top sheet of material in the pad. A corner of the top sheet is turned up to show the lower surface of the sheet of material.
FIG. 15 is an enlarged cross-sectional partial view of FIG. 14 taken along the lines of 15—15 of FIG. 14, showing a vertical alignment of strips of adhesive.
Figure 16:
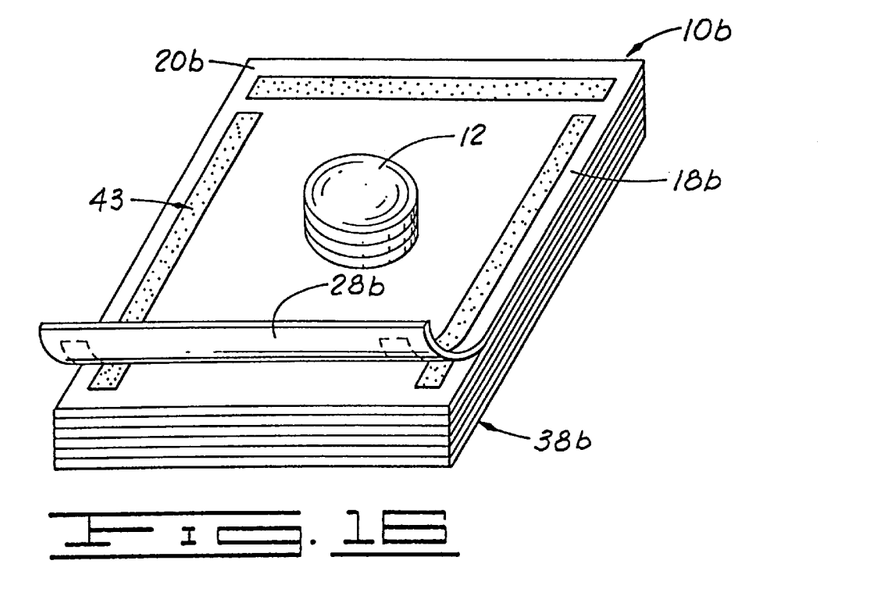
FIG. 16 is a perspective view of the pad of sheets of material shown in FIG. 14, showing a portion of the top sheet of material in the process of being folded over the hamburger.
Figure 17:
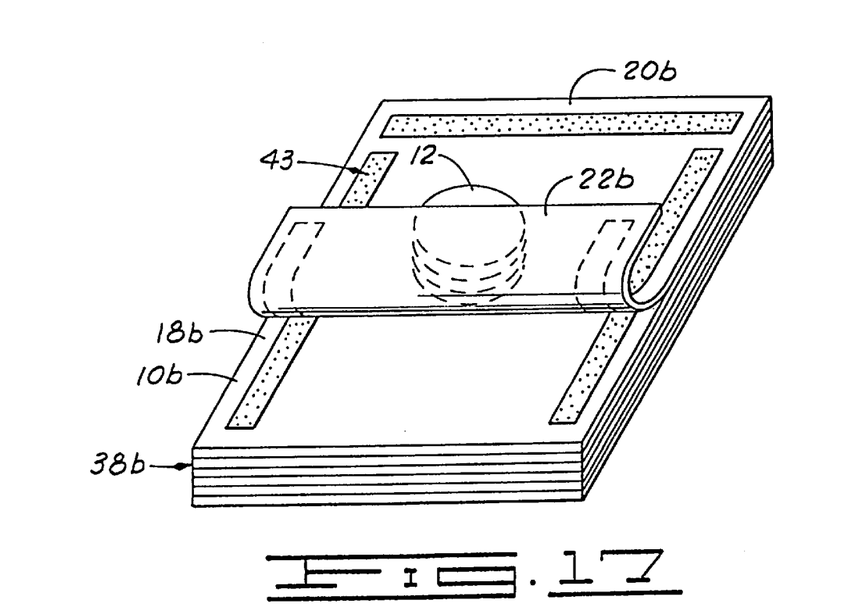
FIG. 17 is a perspective view of the pad of sheets of material shown in FIG. 16, with a portion of the top sheet of material folded over the hamburger.
Figure 18:
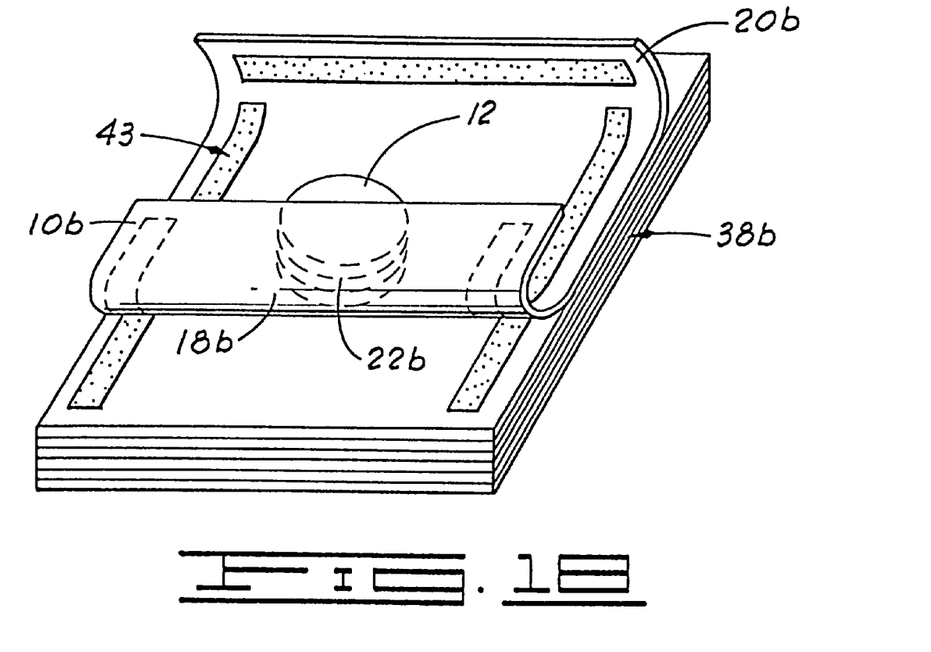
FIG. 18 is a perspective view of the pad of sheets of material shown in FIG. 17, with another portion of the top sheet of material in the process of being folded over the first portion of the top sheet of material and the hamburger.
Figure 19:
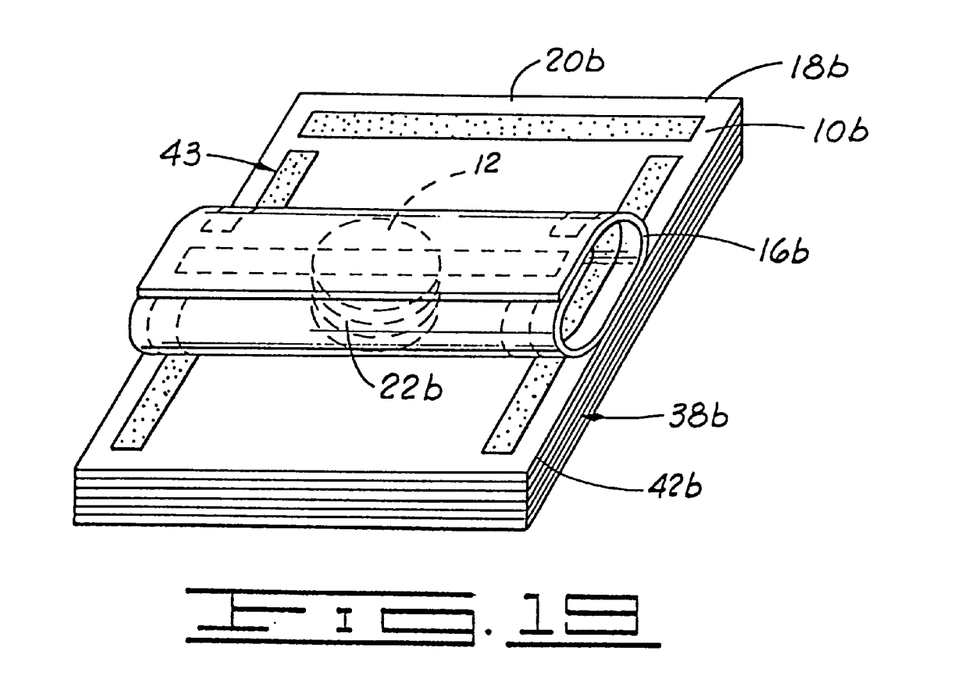
FIG. 19 is a perspective view of the pad of sheets of material shown in FIG. 18, with the top sheet of material completely folded about the hamburger.

Another method of use is shown in FIGS. 14–19. A food item 12 is disposed on the upper surface 20b of the top sheet of material 40b in a pad 38b of sheets of material 18b (FIG. 14). The second side 28b of the top sheet of material 40b is folded over the food item, causing the second side 28b to overlap a portion of the top sheet of material 40b (FIG. 16), the second side 28b bondingly connecting to the portion of the top sheet of material 40b by the bonding material strips 43 disposed on the upper surface 20b of the top sheet of material 40b near the fourth side 32b and the third side 30b. The first side 26b is then folded over the portion of the second side 28b which covers the food item 12 (FIG. 18). The bonding material strip 43 disposed near the upper surface 20b of the first side bondingly connects with the overlapped portion of the second side 28b, resulting in the top sheet of material 40b being formed into a package 16b which encloses the food item 12, and exposing the next sheet of material 42b for use (FIG. 19).

The present invention particularly is adapted to be used in connection with a food preparation center (not shown) such as a McDonald's® or a Wendy's® type of restaurant or other restaurant where food is prepared for consumption at the center or for take away by the customer for consumption at a location remote from the center. In this application, the food is prepared at the food preparation center. The prepared food item then is wrapped in any of the sheets of material described herein. The sheet of material is wrapped about the food item and then is bondingly connected to provide a wrapper substantially encompassing the food item with the food item being substantially bondingly enclosed within the wrapper by way of the bonding connection between portions of the sheet of material but without the food item being in contact with the bonding material. The food item then is delivered to the customer in the wrapper for consumption at the center or to be taken away by the customer and consumed at a location remote from the center.

The wrapper of the present invention provides a relatively quick and convenient wrapper for wrapping prepared food items and a wrapper which can be bondingly closed about the food item in a relatively quick and convenient manner for maintaining the food item fresh and for maintaining the food item substantially hot or cold as desired in a particular application.

Figure 25:
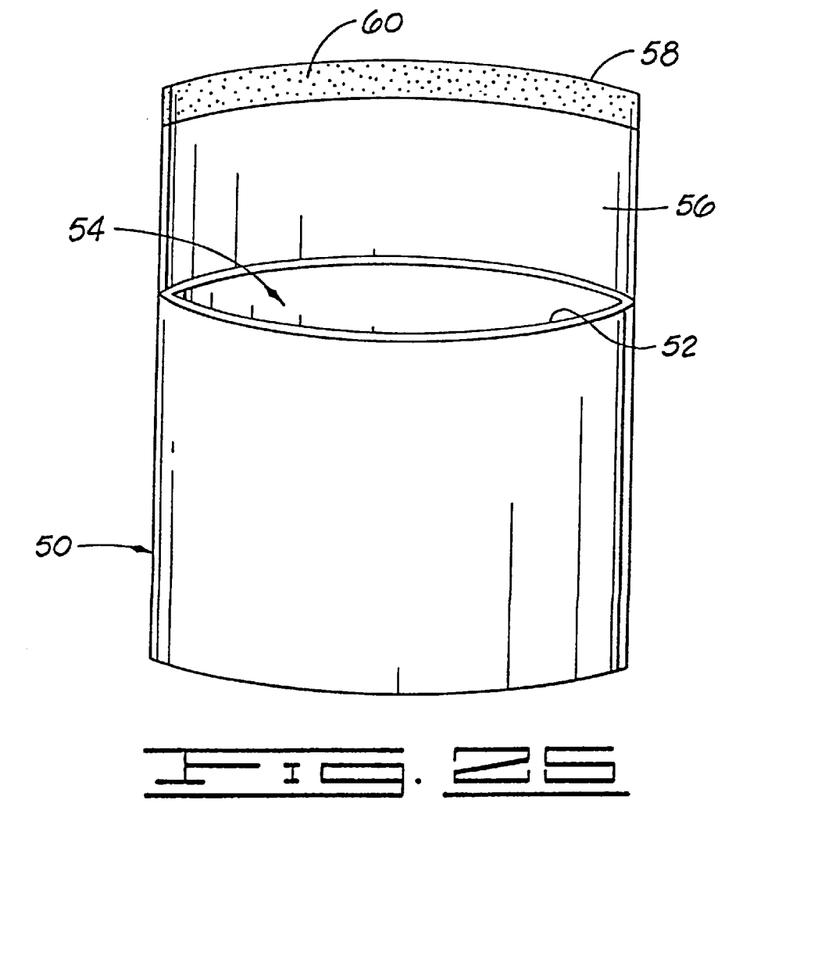
FIG. 25 is a perspective view of another modified wrapper.

In each of the instances described before, the sheet of material is bondingly connected to form a wrapper for the food item. Shown in FIG. 25 is another modified wrapper 50 which is constructed of a sheet of material like the other sheets of material described herein except the sheet of material already has been connected or sealed and folded to form the wrapper 50 having an opening 52 in one end thereof providing access to a food retaining space 54. A flap 56 is connected to one end of the wrapper 50 and extends a distance from the opening 52 terminating with an end 58. A bonding material 60 is disposed on the flap 56. The flap 56 preferably is integrally formed with the wrapper 50 from a single sheet of material.

In operation, the food item is disposed through the opening 52 into the food retaining space 54. The flap 56 then is folded over the opening 52 and the flap 56 is brought into engagement with a portion of the wrapper near the opening 52 whereby the bonding material 60 bondingly engages a portion of the wrapper 50 to seal the flap in a position extending over and enclosing the opening 52.

It should be noted that the flap 56 may be provided as a separate item with bonding material disposed on each end thereof. In this embodiment, after the food item is disposed in the food retaining space 54, the flap 56 is bondingly connected to the wrapper 50 and then extended or folded over the opening 52 and the opposite end of the flap 56 then is connected to the wrapper 50.

Shown in FIG. 26 is a modified wrapper 50h which is constructed exactly like the wrapper 50 shown in FIG. 25, except the wrapper 50h has a cohesive bonding material 60h disposed thereon near the end 58h thereof. An additional cohesive bonding material 62 is disposed on another portion of the wrapper.

The wrapper 50h will operate exactly like the wrapper 50 shown in FIG. 25, except, after the food item has been disposed in the food retaining space 54h, the flap 56h is folded over the opening 52h and the cohesive bonding material 60h is brought into bonding contact with the cohesive bonding material 62 for bondingly connecting the end 58 to the wrapper 50h.

Figure 27:
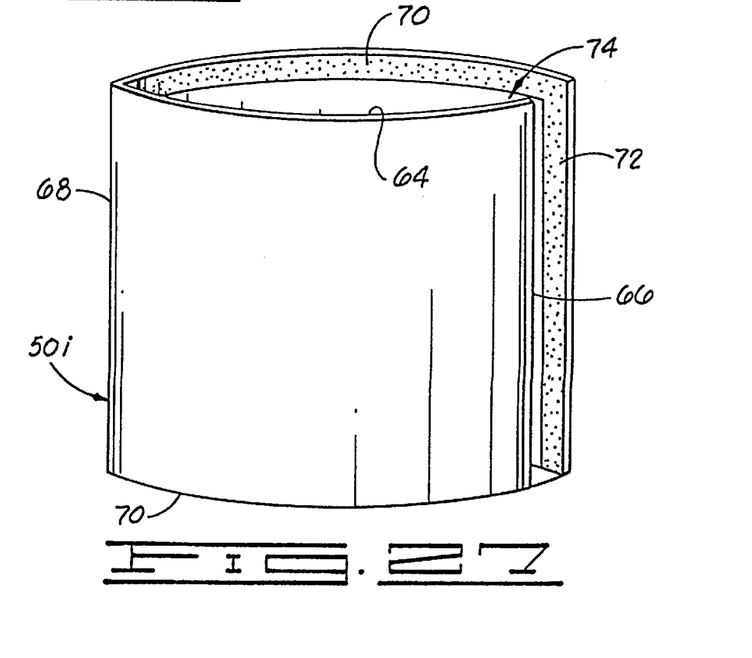
FIG. 27 is a perspective view of yet another modified wrapper.
Figure 28:
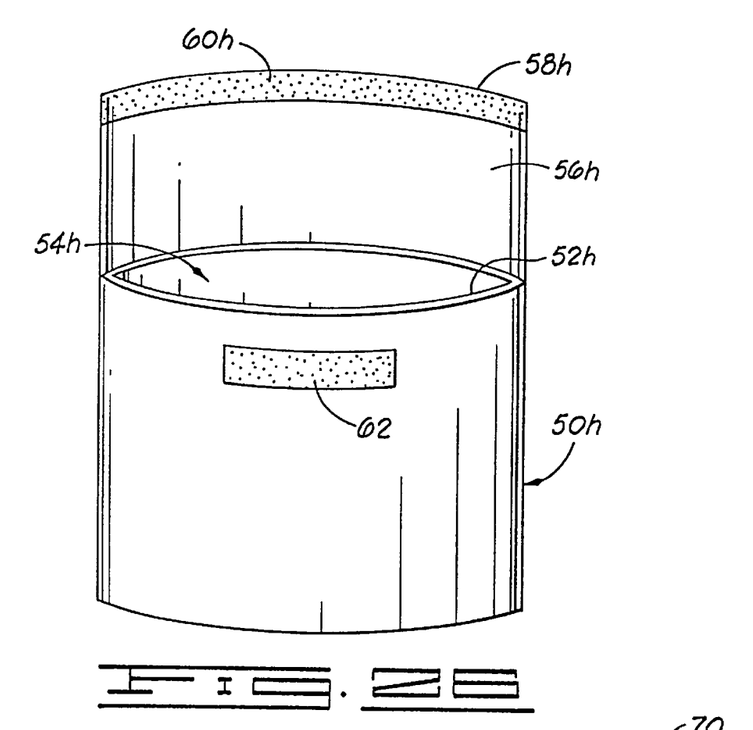

Shown in FIG. 27 is another modified wrapper 50i. The modified wrapper 50i has an opening 64 through one end thereof and another opening 66 through one side thereof with the sides 68 and 69 being either sealed or folded over to form the two openings 64 and 66 in the upper end and side of the wrapper 50i. In this embodiment, a bonding material 70 extends along one side of the upper end and another bonding material 72 extends along one of the sides of the wrapper 50i. The openings 64 and 66 combine to provide an opening wherein the food item can be inserted through the openings 64 and 66 and into a food retaining space 74. After the food item has been disposed in the food retaining space 74, the upper end and the sides of the wrapper 50i are brought into engagement whereby the bonding material 70 bondingly engages another portion of the wrapper 50i to bondingly seal the opening 64 and the bonding material 72 bondingly engages another portion of the wrapper 50*i* to bondingly seal the opening 66.

The wrappers shown in FIGS. 25, 26 and 27 also could be provided in a pad of the wrappers with a separate strip of bonding material (not shown) used to connect the wrappers to each other in the pad format.

Changes may be made in the embodiments of the invention described herein or in parts or elements of the embodiments described herein or in the steps or in the sequence of steps of the methods described herein without departing from the spirit and scope of the invention as defined in the following claims.

What is claimed is:

1. A method for wrapping a food item, comprising the steps of:

preparing the food item at a restaurant of the type where the food item is consumed by a customer at the restaurant or taken away by the customer for consumption at a location remote from the restaurant;

providing a plurality of sheets of material at the restaurant, each sheet of material having an upper side, a lower side and an outer periphery, the sheets of material being stacked such that an uppermost sheet of material constitutes a top sheet of material, each sheet of material having a bonding material disposed on at least a portion of the lower surface thereof so as to extend a distance along at least a portion of the outer periphery of the lower surface of the sheet of material;

disposing the prepared food item on the upper surface of the top sheet of material at the restaurant; and folding at least the top sheet of material over the prepared food item such that at least a portion of the sheet of material overlaps another portion of the sheet of material whereby the overlapped portions of the sheet of material are bondingly connected and thereby provides a wrapper for the prepared food item at the restaurant wherein the prepared food item is maintained in a non-contact relation with the bonding material disposed on the lower surface of the flexible sheet of material.

2. The method of claim 1 wherein, in the step of providing the sheets of material, the bonding material on the lower surface of each sheet of material is a pressure sensitive adhesive or cohesive.

3. The method of preparing a wrapped food item at of claim 1 wherein each sheet of material is further characterized as having a first side, a second side opposite the first side, a third side and a fourth side opposite the third side and wherein the bonding material is disposed on the lower surface of each sheet of material such that the bonding material extends along at least a portion of the first side of each sheet of material such that upon wrapping the sheet of material about the prepared food item the first side of the sheet of material is bonded to an overlapping portion of the sheet of material and thereby provides a wrapper about the prepared food item while maintaining the prepared food item in a non-contact relation with the bonding material disposed on the sheet of material.

4. The method of preparing a wrapped food item of claim 1 wherein the sheet of material is further characterized as having a first side, a second side opposite the first side, a third side and a fourth side opposite the third side and wherein the bonding material disposed on the lower surface of each sheet of material extends along the first and third sides of each sheet of material such that upon wrapping the sheet of material about the prepared food item the first side of the sheet of material is bondingly connected to an overlapping portion of the sheet of material and the third side of the sheet of material is bondingly connected to and overlapping portion of the sheet of material thereby providing a wrapper which substantially encompasses the prepared food item while maintaining the prepared food item in a non-contact relation with the bonding material disposed on the sheet of material.

5. A method for preparing a wrapped food item comprising the steps of:

preparing a food item at a restaurant of the type where the food item is consumed by a customer at the restaurant or taken away by the customer for consumption at a location remote from the restaurant;

providing at least one sheet of material at the restaurant, the sheet of material having an upper surface, a lower surface and an outer periphery, the sheet of material having a bonding material disposed on at least a portion of the lower surface of the sheet of material so as to extend along at least a portion of the outer periphery of the sheet of material;

positioning the prepared food item on the upper surface of the sheet of material at the restaurant; and folding the sheet of material over the prepared food item so as to cause a portion of the sheet of material to bondingly connect to an overlapped portion of the sheet of material via the bonding material disposed on the lower surface of the sheet of material whereby the prepared food item is at least partially enclosed by the sheet of material and thereby provides a wrapped prepared food item at the restaurant wherein the prepared food item is maintained in a non-contact relation with the bonding material on the sheet of material.

6. The method of claim 5 wherein, in the step of providing the sheet of material, the bonding material on the sheet of material is a pressure sensitive adhesive or cohesive.

7. The method of preparing a wrapped food item of claim 5 wherein the sheet of material is further characterized as having a first side, a second side opposite the first side, a third side and a fourth side opposite the third side and wherein the bonding material disposed on the lower surface of each sheet of material extends along the first and third sides of each sheet of material such that upon wrapping the sheet of material about the prepared food item the first side of the sheet of material is bondingly connected to an overlapping portion of the sheet of material and the third side of the sheet of material is bondingly connected to and overlapping portion of the sheet of material thereby providing a wrapper which substantially encompasses the prepared food item while maintaining the prepared food item in a non-contact relation with the bonding material disposed on the sheet of material.

8. The method of preparing a wrapped food item of claim 5 wherein each sheet of material is further characterized as having a first side, a second side opposite the first side, a third side and a fourth side opposite the third side and wherein the bonding material is disposed on the lower surface of each sheet of material such that the bonding material extends along at least a portion of the first side of each sheet of material such that upon wrapping the sheet of material about the prepared food item the first side of the sheet of material is bonded to an overlapping portion of the sheet of material and thereby provides a wrapper about the prepared food item while maintaining the prepared food item in a non-contact relation with the bonding material disposed on the sheet of material.

* * * * *